US009495467B2

(12) United States Patent
Ursitti et al.

(10) Patent No.: US 9,495,467 B2
(45) Date of Patent: Nov. 15, 2016

(54) SYSTEM AND METHOD FOR MANAGING NEWS HEADLINES

(75) Inventors: Michael A. Ursitti, Califon, NJ (US); Vincent Collier, East Windsor, NJ (US); Debra Cook, Waltham, MA (US); Amy Attanasio, Flemington, NJ (US); Kevin Reynolds, Yardley, PA (US)

(73) Assignee: Bloomberg Finance L.P., New York, NY (US)

( * ) Notice: Subject to any disclaimer, the term of this patent is extended or adjusted under 35 U.S.C. 154(b) by 1623 days.

(21) Appl. No.: 11/250,829

(22) Filed: Oct. 13, 2005

(65) Prior Publication Data

US 2006/0242158 A1    Oct. 26, 2006

Related U.S. Application Data

(60) Provisional application No. 60/618,386, filed on Oct. 13, 2004.

(51) Int. Cl.
*G06F 17/00* (2006.01)
*G06F 17/30* (2006.01)
*G06F 17/24* (2006.01)
*G06F 17/27* (2006.01)
*G06Q 10/10* (2012.01)

(52) U.S. Cl.
CPC ......... *G06F 17/30873* (2013.01); *G06F 17/24* (2013.01); *G06F 17/2745* (2013.01); *G06Q 10/10* (2013.01)

(58) Field of Classification Search
CPC .............................. G06F 17/30; G06K 9/6253
USPC ......................................... 715/210, 200, 255
See application file for complete search history.

(56) References Cited

U.S. PATENT DOCUMENTS

| | | | |
|---|---|---|---|
| 5,287,278 A * | 2/1994 | Rau .................................. 704/1 |
| 5,937,422 A * | 8/1999 | Nelson et al. ................ 715/206 |
| 5,940,843 A * | 8/1999 | Zucknovich et al. ........ 715/210 |
| 5,959,621 A * | 9/1999 | Nawaz ...................... G06F 3/14 715/733 |
| 6,289,350 B1 * | 9/2001 | Shapiro et al. .............. 705/26.1 |
| 6,327,628 B1 | 12/2001 | Anuff et al. |
| 6,430,575 B1 * | 8/2002 | Dourish et al. |
| 6,577,329 B1 * | 6/2003 | Flickner ................. G06Q 30/02 715/774 |
| 6,584,466 B1 * | 6/2003 | Serbinis et al. .............. 715/209 |

(Continued)

FOREIGN PATENT DOCUMENTS

WO    WO 02/15053    2/2002

OTHER PUBLICATIONS

Zajic et al., Automatic Headline Generation for Newspaper Stories, 2002, CiteSeer, pp. 1-8.*

(Continued)

*Primary Examiner* — Manglesh M Patel
(74) *Attorney, Agent, or Firm* — Chiesa Shahinian & Giantomasi PC

(57) ABSTRACT

Systems and methods are provided related to a news-editing environment that may facilitate expedited editing, creation, and dispatching of news headlines. Articles are acquired from a plurality of information sources, preprocessed, and then queued for creation of a headline by one or more editors. Metadata may also be associated with an article, a headline, or both. Once a headline has been composed, the editor dispatches it, and the headline may subsequently be send to one or more consumers.

21 Claims, 7 Drawing Sheets

(56) References Cited

U.S. PATENT DOCUMENTS

| | | | |
|---|---|---|---|
| 6,651,219 B1* | 11/2003 | Elliott | 715/209 |
| 6,684,212 B1* | 1/2004 | Day et al. | |
| 6,714,909 B1 | 3/2004 | Gibbon | |
| 6,732,090 B2* | 5/2004 | Shanahan et al. | |
| 6,772,146 B2* | 8/2004 | Khemlani et al. | 705/36 R |
| 6,983,287 B1 | 1/2006 | Jayanti et al. | |
| 7,137,067 B2* | 11/2006 | Yanase et al. | 715/243 |
| 7,171,620 B2* | 1/2007 | Castellani et al. | 715/229 |
| 7,257,767 B1* | 8/2007 | Carden, Jr. | 715/234 |
| 7,330,830 B1* | 2/2008 | Lamoureux et al. | 705/34 |
| 7,464,078 B2* | 12/2008 | Dill et al. | 707/3 |
| 7,483,871 B2* | 1/2009 | Herz | |
| 7,502,770 B2* | 3/2009 | Hillis et al. | 706/45 |
| 7,912,811 B2* | 3/2011 | Hodel-Widmer | 707/608 |
| 8,131,735 B2* | 3/2012 | Rose et al. | 707/750 |
| 8,326,833 B2* | 12/2012 | Muguda | 707/736 |
| 8,335,787 B2* | 12/2012 | Shein et al. | 707/730 |
| 8,458,085 B1* | 6/2013 | Yakubov | G06Q 40/00 705/35 |
| 2002/0133449 A1* | 9/2002 | Segal | G06Q 40/04 705/37 |
| 2002/0161603 A1* | 10/2002 | Gonzales | 705/1 |
| 2003/0028503 A1 | 2/2003 | Giuffrida et al. | |
| 2003/0130993 A1* | 7/2003 | Mendelevitch et al. | 707/3 |
| 2003/0217061 A1* | 11/2003 | Agassi et al. | 707/10 |
| 2004/0027349 A1 | 2/2004 | Landau et al. | |
| 2004/0162895 A1* | 8/2004 | Mok et al. | 709/223 |
| 2005/0004862 A1 | 1/2005 | Kirkland et al. | |
| 2005/0165743 A1* | 7/2005 | Bharat et al. | 707/3 |
| 2006/0010162 A1* | 1/2006 | Stevens et al. | 707/104.1 |
| 2006/0026502 A1* | 2/2006 | Dutta | 715/511 |
| 2008/0092077 A1* | 4/2008 | Mather et al. | 715/781 |
| 2008/0183665 A1* | 7/2008 | Brinker et al. | 707/2 |

OTHER PUBLICATIONS

Rong et al., Headline Generation using a Training Corpus, 2001, Carnegie Mellon University, pp. 1-10.*

Banko et al., Headline Generation Based on Statistical Translation, 2002, ACM, pp. 1-8.*

Wan et al., Using Thematic Information in Statistical Headline Generation, 2003, ACM, pp. 1-10.*

Mondal et al., Improved Algorithms for Keyword Extraction and Headline Generation From Unstructured Text, 2004, CS. Northwestern.edu, pp. 1-14.*

Supplementary European Search Report dated Oct. 20, 2009.

* cited by examiner

FIG. 4

| | Settings | Tools | | Active wires: BV2, PR2 Mode: | Sort: Newest to Oldest Headline | | Time: 12:32 | | | |
|---|---|---|---|---|---|---|---|---|---|---|
| | | Rls# | Headline | | | Ticker | who | Num | FDSG | Age |
| E M J F W | | | | | | | | | | |
| E | W | 765 | Com21 Reports Fourth Quarter Revenue of $25M. Revenue Totals $123M | | | CMTO ↕ | | 0 | ○○○○ | 0 |
| E M J | W | 501 | JDS Uniphase Third Quarter Results | | | JDSU SP | BB DD | 0 | ○○○○ | 0 |
| J | W | 876 | Coldwater Creek Announces Distribution Center Consolidation And Staff Reductions | | | CWTR | | 0 | ○○○○ | 0 |
| J | | 847 | Sprint Awards US$1.1 Billion Deal to Nortel Networks for Next Generation Network | | | NT SP | | 2 | ○○○○ | 0 |
| E | | 431 | Release of 'Footprints and Milestones' | | | | | 0 | ○○○○ | 0 |
| E M | W | 889 | U.S. Physical Therapy Reports Record Income for Third Quarter; Third Quarter Net Income up 71% on | | | USPH | KR JT | 3 | ○○○○ | 0 |
| | | 919 | Oracle Delivers a First in O2EE and Web Services Development with New Java Tool | | | ORCL SP | HS | 2 | ○○○○ | 0 |
| | W | 654 | Gadzoox Networks Accelerates Plan to Comply Restructures Workforce and Ramps 2Gb Platform | | | ZOOX ↕ | | 0 | ○○○○ | 0 |
| E M J F W | | 123 | Alpha Beta Company Releases Important Information. This is a Test. This is a Test. This | | | SAMPLE ↕ > SP | JD JP MS AA BB CC | 99 | ○○○○ | 99 |

FIG. 6

| Descriptive | | | | | |
|---|---|---|---|---|---|

Ford Motor Company

| DES Mkt Cap USD 28,996.07M | EE First Call Est. Q2 Q3 | ERN | FY End | DEC |
|---|---|---|---|---|
| Emp 354,430 as of 12/31/ | F Means EPS 0.25 -0.16 | | Em Curr | USD |
| 01 | # of Ests 17 16 | DVD | Freq. | Quarterly |
| HP Avg Vol (3-Mo) 29,636,016 | Q Revenue -310M -282M | | Cast Amt | 0.10 |
| Close USD 16.28 | | | | |

```
694070  BN  15:45  Ford Taurus Pedals Investigated in Acceleration Cases (Update1)
    1)  BN  12:47  Ford Agrees to Pay $30 Mln to Clean up Ohio Dump site (Update1)
    2)  BN  12:17  Chrysler Pushes Ram sales After 1st-Qtr Increase (Update1)
    3)  BN  12:13  Ford Agrees to Pay $30 Million to Clean up Ohio National Park
    4)  BN  12:06  "Superfund Settlement with Justice Department Approved by Judge
    5)  BN  12:06  "Ford Agrees to Pay $30 Mln to Clean Up Ohio Park
    6)  BN  11:33  As Ford Plant Closes, New Jersey Town Struggles with Job Losses
    7)  SPC 10:55  Summary Analysis-Hertz Corp.
    8)  BN  10:22  Daimler Chrysler's Dodge Pushes Ram Sales After 1st-Qtr Increase
    9)  AFX 10:00  Focus Linde not set for fundamental strategy changes under new
   10)  PRN  8:56  TRW Honored with Ford's 2001 World Excellence Award
   11)  CCN  8:04  Raydan Awarded Conversion Contract for Ford Class 6 Trucks
   12)  BN   4:13  Jaguar's Blume: Japan Sales, Yen and Ford's Mark Fields
   13)  BN   2:36  MG Rover Sees FY01 Loss Narrowing, Profit in 2003, Paper says
   14)  AFX  2:10  Linde to develop new fuel systems unit under new chairman
   15)  BN   1:53  Mazda Shares Rise on Expectations for New President (Update3)
   16)  BN   1:05  Mazda News Conf. 4/19: New President and Profitability
   17)  BN   0:01  Bill Ford Helps Rich Scotsman Pile on More Wealth: Doron Levin
   18)  BN   4/21  Mazda Shares Rise on Expectations for New President (Update2)
   19)  BN   4/21  Mazda Shares Rise After Booth Names as New President (Update1)
```

FIG. 7

SYSTEM AND METHOD FOR MANAGING NEWS HEADLINES

PRIORITY APPLICATION

This application claims the benefit of U.S. provisional patent application No. 60/618,386, titled System and Method for Managing News Headlines, filed Oct. 13, 2004, which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyrights whatsoever.

BACKGROUND

The present invention relates generally to a system and method for receiving and processing news information from multiple information sources. More particularly, the present invention relates to providing a news-editing environment for facilitating expedited editing, creation, and dispatching of news headlines.

BRIEF SUMMARY

According to an embodiment of the present invention, a computerized system for processing articles and generating headlines is provided, whereby information may be dispatched to one or more consumers of such information. The articles may be received from one or more data sources.

A preprocessing module processes a received article and generates metadata, which is associated with the received article. A headline-editing module receives an article and the associated metadata and comprises one or more tools for creating and/or editing headlines. A headline provided by such a module may be dispatched to one or more consumers, which may comprise, e.g., customers of a news and/or other information service, data processing systems and/or applications, and databases and/or other storage facilities.

According to another embodiment of the present invention, the headline-editing module comprises a window application interface and is run from a window-based environment.

According to another embodiment of the present invention, the headline-editing module comprises a headline monitoring facility.

According to another embodiment of the present invention, a method of generating news headlines for dispatch to one or more customers associated with a news organization is provided. The method comprises receiving a plurality of articles from a one or more of information sources. The received articles are preprocessed for attaching and/or extracting information related to the received articles. Based on the preprocessed received articles, news headlines are provided.

According to another embodiment of the present invention, a headline monitoring facility is provided permitting an editor to select one or more articles for which headlines are to be provided.

According to another embodiment of the present invention, the plurality of editing tools are optimally organized within a window application interface such that a headliner is provided with the opportunity to edit an existing headline associated with the desired news headline in an expedited manner.

According to another embodiment of the present invention, the displayed news headlines are distributed to one or more customers associated with a news organization.

According to another embodiment of the present invention, the headline editing tools appear contemporaneously on a plurality of display screens.

BRIEF DESCRIPTION OF THE DRAWINGS

The invention is illustrated in the figures of the accompanying drawings, which are meant to be exemplary and not limiting, and in which like references are intended to refer to like or corresponding parts.

FIG. 4 depicts a user interface screen that may be displayed in connection with monitoring the receipt of articles.

FIG. 6 depicts a user interface screen that may be displayed in connection with creating, editing, and/or dispatching news headlines.

FIG. 7 depicts a user interface screen comprising information related to a corporation.

DETAILED DESCRIPTION OF THE PREFERRED EMBODIMENTS

Figure 1:
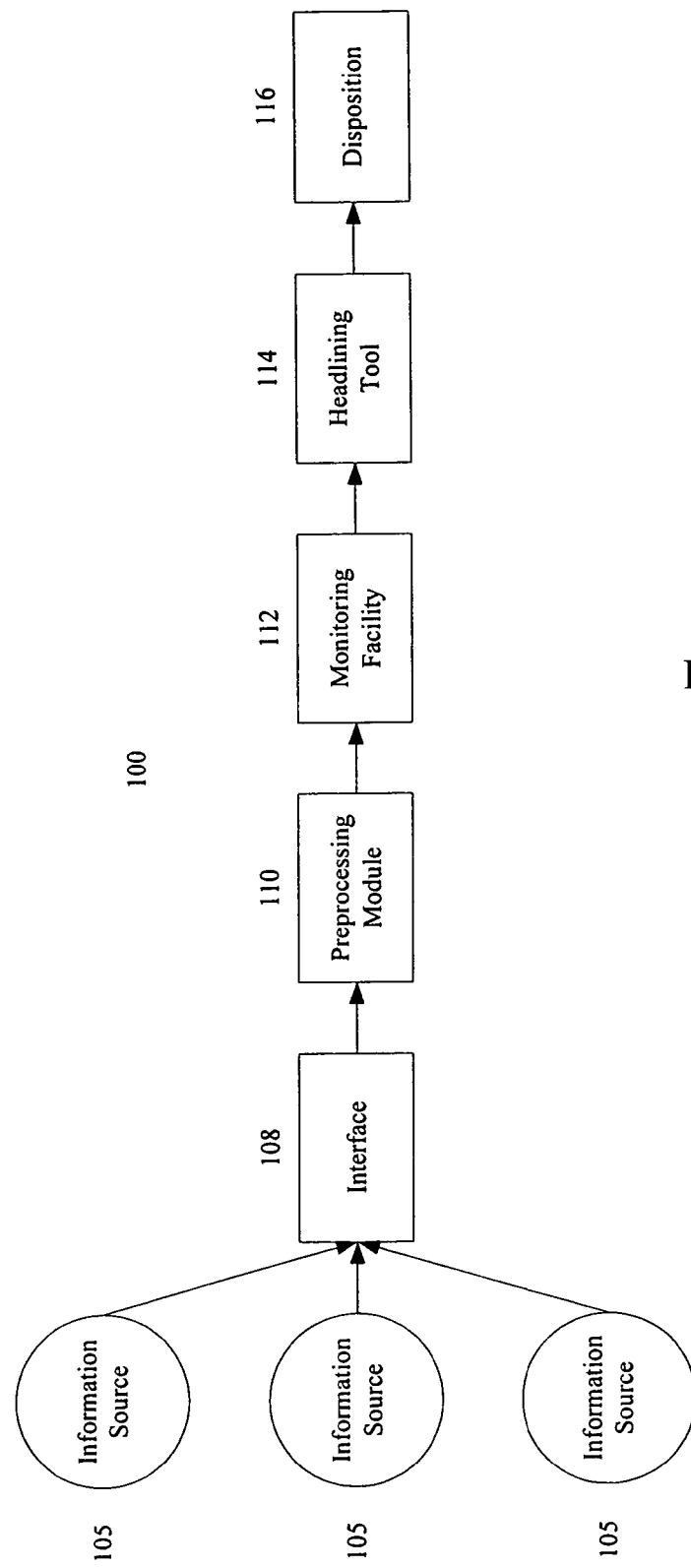
FIG. 1 depicts schematically a logical arrangement of modules according to an embodiment of the invention.

According to an embodiment of the invention, articles may be acquired, preprocessed, annotated, and then dispatched to one or more consumers. FIG. 1 depicts abstractly the flow 100 of information according to one possible embodiment of the invention. Articles may be gathered from one or more information sources 105 at one or more interfaces 108. Once acquired, an article is submitted to a preprocessing module 110, which may, e.g., identify persons, places, things, organizations, symbols, and/or events, among other things; attach metadata to the article; and/or route the article for future processing. A preprocessed article is added to a module comprising a monitoring facility 112, and may from there be selected for use with a headlining module 114, which comprise one or more manual and/or automated tools for creating and/or editing headlines or other annotations associated with the document.

Disposition 116 follows headlining, as the headline is dispatched to one or more consumers. The word "consumer" is used in a broad sense, and may comprise, e.g., a user, a data processing system and/or application, an information provider, an archive and/or a database, etc. Disposition may also comprise dispatching the article associated with the headline to one or more consumers, which may or may not be the same as those to which the headline is dispatched.

As a consumer of a headline, an article, or both, a data processing system and/or application may itself process the received information and/or forward the information, processed or unprocessed, to one or more other consumers. One example of such processing may involve indexing one or more terms in an article and adding to results to one or more indexes of articles. In an embodiment of the invention, such processing may take place without impeding headline generation, e.g., by taking place after headlining is complete or by taking place on one or more systems in parallel with headline generation.

The word "article" is used herein in a broad sense, and may comprise any document, comprising a substantial portion of text, regarding one or more specific topics. Articles may be, e.g., news stories and/or press releases, among many other kinds of documents. In connection with an embodiment of the invention, reference may be made to "releases" and/or "press releases," but it is to be understood that any and all such references are to be considered exemplary and not limiting, and that any article may be substituted for a release and/or a press release without affecting the principle of the invention.

It will be appreciated that the modules depicted in FIG. 1 represent logical elements in an abstract description of a data processing system. In an embodiment, software implementing one or more logical elements may comprise one or more software modules and/or sub-modules. Moreover, without limiting the foregoing, functionality depicted in more than one logical element may in an embodiment be implemented in a single software module or sub-module.

It will also be appreciated that additional modules may exist besides those depicted in FIG. 1, and that such modules provide functionality in addition to that provided by the depicted modules. For example, a categorization module (not pictured) may classify an article into one or more subject matter categories. Such classification may then, depending on the embodiment of the invention, be used to, e.g., direct an article to one or more specific editors to provide a headline and/or affect the selection of one or more consumers to which the headline and/or article may be dispatched.

It will also be appreciated that software implementing any one or more logical elements of a data processing system and/or any one or more software modules and/or sub-modules according to an embodiment of the invention may be distributed and/or stored on one or more computer-readable media.

Figure 2:
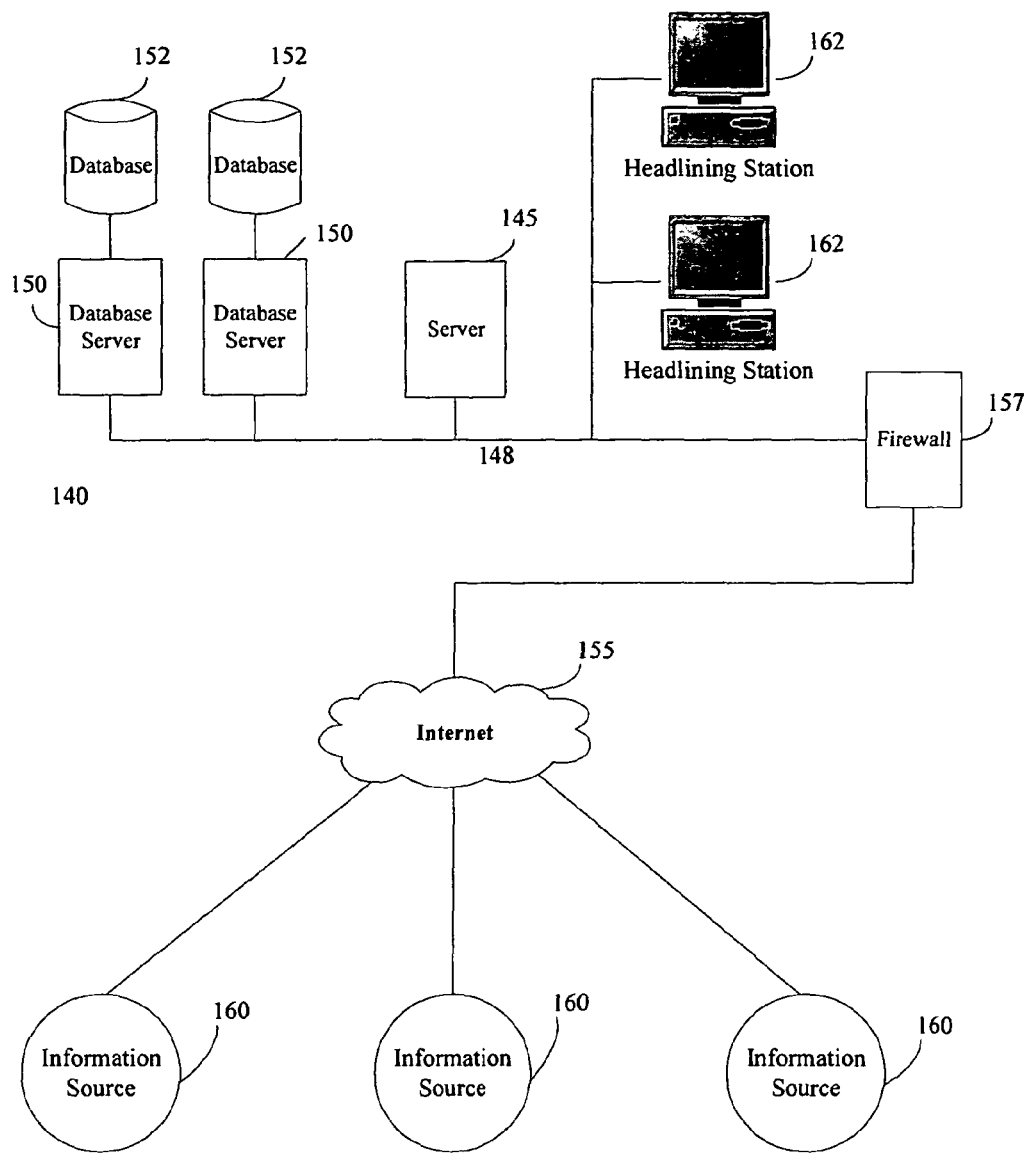
FIG. 2 depicts schematically a computer network architecture on which an embodiment of the invention may be based.

A computer network architecture 140 on which an embodiment of the invention may be implemented is depicted schematically in FIG. 2. The invention may be embodied in computer software, software components, or both, executing on one or more servers 145. A server may be connected by one or more interconnected local area networks 148 to one or more database servers 150, each of which provides access to one or more databases 152.

In the architecture 140 represented by FIG. 2, communication with other sources and consumers of information is achieved using the Internet 155. Access to the Internet may optionally be through one or more firewalls, gateways, or other security arrangements 157. Other means of communication (not pictured) may also be used instead of or in addition to the Internet, such as dial-up lines, dedicated leased lines, and private wide area networks.

In the architecture 140 represented by FIG. 2, articles are obtained through one or more information sources 160. An information source 160 may comprise, e.g., a news wire or other news service and/or a source of press releases. One or more servers 145 and/or software on one or more servers may comprise one or more interfaces that receive articles from the one or more information sources 160.

The architecture 140 also comprises one or more headlining stations 160 from which an editor may interact with an embodiment of the invention. A headlining station may comprise one or more electronic display devices and/or one or more computer input devices. An embodiment may present, e.g., one or more user interface screens (not pictured) on one or more electronic display devices associated with a headlining station 160. Such a headlining station may comprise an operating environment based on a graphical windowing system, and in the presence of such a windowing system, one or more user interface screen may be displayed within a window. An embodiment may apply editor input from one or more headlining stations 160 to control a headlining module 114 (FIG. 1) as well.

Figure 3:
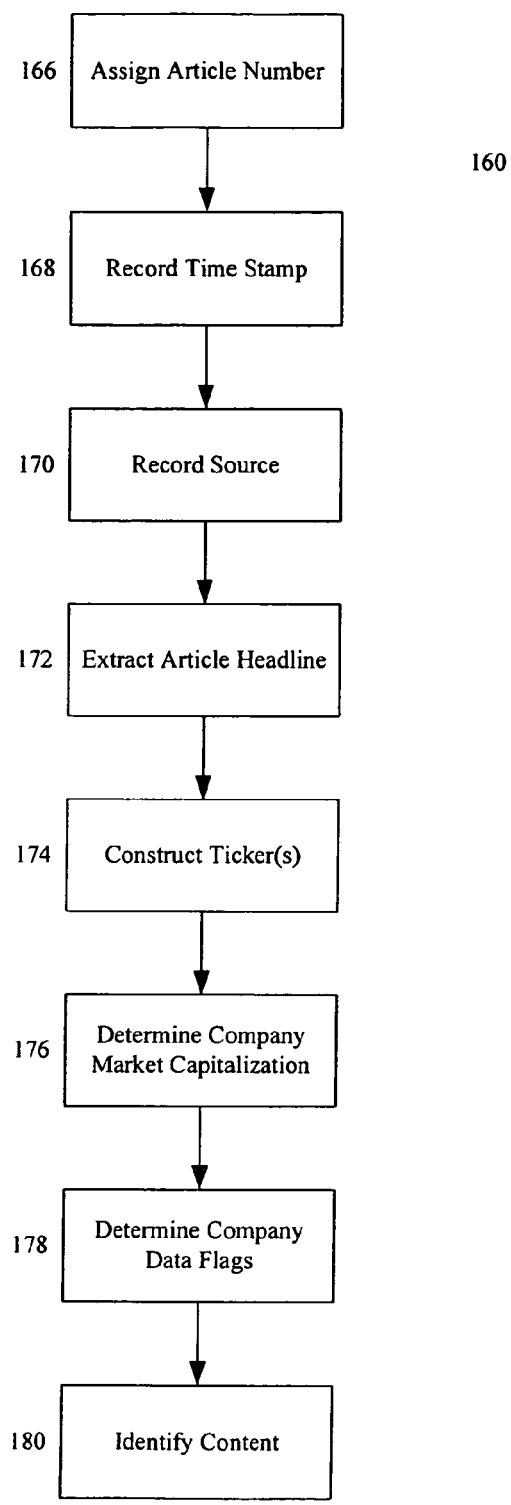
FIG. 3 depicts preprocessing of an article according to an embodiment of the invention.

Preprocessing 160 an article according to an embodiment of the invention is depicted schematically in FIG. 3. Preprocessing may comprise attaching and/or otherwise associating data with an article. (Such additional data may be referred to as "metadata".) In the depicted embodiment, preprocessing begins with assigning a unique number or other identifier to the article in block 166. The time the embodiment received the article is recorded in block 168, and the source of the article is recorded in block 170.

In block 172, a headline is extracted from the article. Article formats may vary between sources, and embodiments of the invention may therefore be configured with source- and/or format-dependent rules for extracting a headline from an article. Instead of or in addition to such configured rules, an embodiment of the invention may comprise algorithmic text analysis to extract headlines from articles.

An embodiment of the invention may in block 174 extract one or more symbols representing stock exchanges and/or tickers. A ticker, representing a security, may comprise and/or be associated with one or more codes indicating an exchange and/or a country. Extraction may thus comprise extracting such additional information as is available. Such an embodiment may translate any such extracted symbols to an internal or external standard for further processing and/or display.

An embodiment of the invention may use some or all information extracted in block 174 to determine the market capitalization of the associated corporation in block 176. This determination may comprise retrieving the market capitalization from one or more databases and/or calculating the market capitalization from data provided by one or more exchanges. Depending on the embodiment, the market capitalization may be normalized to a selected and/or configured currency and/or may be assigned to one or more categories, e.g., small cap, mid cap, large cap, etc.

In block 178, one or more indicators ("flags") may be set based on information extracted from and/or associated with the article. For example, a flag may be set if a specified number of analysts cover the corporation and/or if a specified number of estimates have been made for the corporation's earnings. Other examples of flags include, but are not limited to, a flag indicating that the security is included in an index, e.g. the Dow Jones Industrial Average and/or a flag indicating one or more relatively large changes in the market capitalization within a specified time. Once set, the values of such flags may affect processing of the article and/or may be presented to one or more editors.

An embodiment of the invention may in block 180 classify the article based on its content and/or other data associated with the article. An article may be subjected to one or more specified queries, which may, for example, comprise boolean queries to search for terms in the article. Based on the results of query or queries, the article may classified into one or more categories, e.g., Earnings, Warnings, Permanent Watch List, etc.

Preprocessing may comprise actions in addition to or instead of some or all of those described in connection with FIG. 2. For example, when one or more boolean queries have been executed on an article, one or more of any terms found may be preserved for possible future reference and/or processing. An embodiment may use a markup language such as XML and/or other means to preserve any such identified terms.

The depiction of preprocessing in FIG. 3 and the accompanying description are purely exemplary and are not intended to be limiting in any way. It will be appreciated that the order of the elements of preprocessing may vary substantially without altering the principle of operation. It will also be appreciated that the data attached to, associated with, and/or extracted from an article through preprocessing may involve data different from and/or in addition to the data described herein, again, without altering the principle of operation.

In an embodiment of the invention, the monitoring facility 112 (FIG. 1) may comprise a user interface, which itself may comprise a display such as the monitoring screen 200 depicted in FIG. 4. The monitoring screen 200 may appear in a window (not pictured) displayed on an electronic display device.

The monitoring screen 200 comprises a status bar 206 that may contain information such as active news wires and/or tools specific to a given instance of a monitoring facility. In the embodiment depicted in FIG. 4, the status bar displays information that comprises: the news wires 208 that have been selected for display in the monitoring screen 200; the current mode of operation 210; the sort tool 212 currently in use; and the current system time 214. The news wires 208 may comprise one or more codes that each identify an information source 105 (FIG. 1). Pull-down menus provide access to system and/or editor settings 216 and tool sets 218.

The mode of operation 210 may indicate whether the editor may access a headlining module 114 (FIG. 1) or is limited to viewing the row objects 220. The mode of operation 210 may indicate one or more other modes of operation of the monitoring facility 112 (FIG. 1). For example, in one such mode, the user interface may support one or more tools for selecting two or more row objects 220, and the mode of operation 210 may indicate which such tool is active.

The sort tool 212 controls the order in which row objects 220 appear in the monitoring screen 200. Depending on the embodiment, a sort tool may order row objects 220 according to any one or more properties of each row object 220. For example, row objects 220 may be sorted according to their ages, either newest to oldest or oldest to newest.

A header bar 225 provides column headers that identify the information displayed in the row objects 220 displayed in the monitoring screen 200.

The monitoring screen 200 may comprise one or more row objects 220. A row object 220 is a selectable field that collects for presentation information specific to an article.

Figure 5:
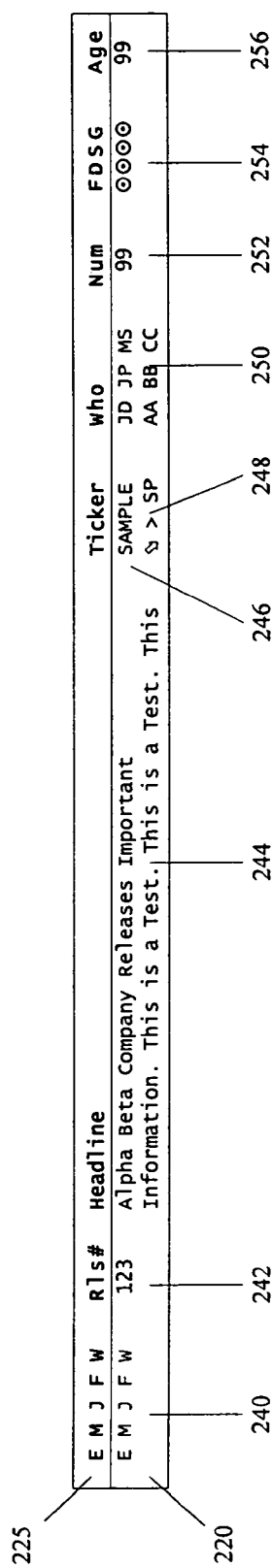
FIG. 5 depicts an example row object such as may appear in a monitoring screen.

A single row object 220 is presented in FIG. 5 below a header bar 225. The row object 220 comprises one or more fields that contain information. According to the embodiment of the invention depicted in FIG. 5, such fields may for example comprise content alert flags 240, a press release and/or article number 242, a headline 244, a ticker 246, corporation data flags 248, team coverage 250, headline count 252, progress flags 254, and/or elapsed time ("Age") 256.

In the depicted embodiment of the invention, the content alert flags 240 indicate the presence of user-specified terms within a given article: if a flag is set, a corresponding letter appears in this field. In the example depicted in FIG. 5, an "E" indicates the presence of terms related to corporate earnings. An "M" is associated with mergers and acquisitions, a "J" is associated with job cuts, an "F" is associated with the federal Food and Drug Administration, and a "W" is associated with warnings. The values of one or more flags may be determined in the preprocessing module 110 (FIG. 1).

Fields in the row object may signify information created and/or extracted during preprocessing 160 (FIG. 3). For example, the press release and/or article number 242 uniquely identifies an article within a collection of articles and may be that assigned in block 166 (FIG. 3). The headline 244 may be the headline extracted in block 172 (FIG. 3), and the ticker 246 may be the standard ticker symbol assigned in block 174 (FIG. 3).

Similarly, the corporation data flags 248 may indicate one or more of the flags set in block 178 (FIG. 3). As depicted in FIGS. 4 and 5, the "⌇" symbol may indicate that the corporation's market capitalization is below a preset level that it had attained relatively recently. The ">" symbol may indicate that at least a preset number of analysts have provided guidance regarding the corporation's future earnings. Other symbols may indicate which stock market indexes, if any, comprise the corporation's stock; for example, in the embodiment of the invention depicted in FIG. 5, the symbol "SP" indicates that the stock is a component of the S&P 500.

The team coverage field 250 indicates which editors, if any, are currently processing the article with a headlining tool. As depicted in FIG. 5, a pair of initials serves to identify an editor, but other codes and/or symbols may serve the same purpose. The headline count field 252 may indicate the number of times that editors have sent headlines from a particular article.

The progress flags 254 indicate the status of a given article within an established headlining workflow. Each flag 254 corresponds to an operation included in the workflow and, in the depicted embodiment of the invention, appears until that operation has been completed. The number, meaning, and/or operation of the flag or flags 254 may vary, depending on the embodiment and the relevant business needs.

In the depicted embodiment of the invention, the time field 256 expresses in minutes the amount of time a give press release has been in the monitoring facility.

Other visual cues, e.g. color and/or highlighting, may indicate properties of a row item 220 and/or the associated corporation. For example, the color of one or more fields and/or the background behind the one or more fields may indicate the corporation's market capitalization. Similar kinds of color alteration may indicate that an alert is associated with the corporation and/or the row item. Other visual indicators may comprise, e.g., varying the font of one or more text fields and/or the presence, absence, coloration, thickness, brightness, and/or other characteristics of a border around the row object 220.

When one or more row items 220 appear in the monitoring screen 200 (FIG. 4), the associated user interface may receive input from an editor indicating an action to be taken with regard to that row item 220. For example, the editor can select one or more row objects 220 and then send the selected object or objects to a headlining module 114 (FIG. 1). The editor can alternatively select one or more row objects and then accept the headline displayed in the headline field 244.

In an embodiment of the invention, a row object 220 may remain in monitoring screen 200 for a finite amount of time or until deleted by an editor.

Figure 6:
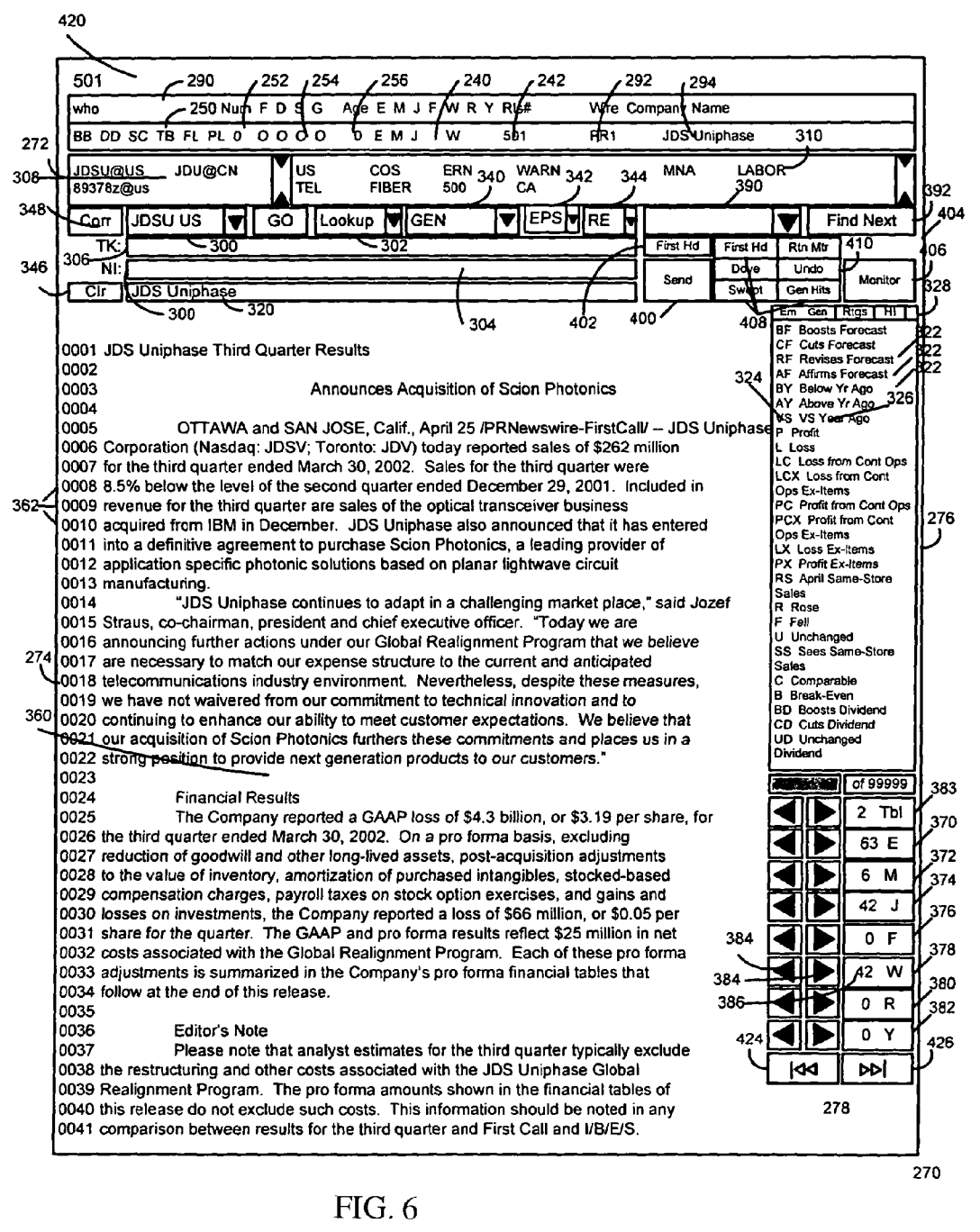

A headlining module 114 (FIG. 1) according to an embodiment of the invention may comprise a user interface that comprises a display such as the headlining screen 270 that FIG. 6 depicts. The headlining screen 270 comprises four main regions. An upper region 272 comprises information related to an article and/or the corporation referred to in it, and controls for editing and/or editing a headline and other information associated with the article. A region 274 comprises the text of the article and line numbers. Another region comprises one or more sets of snippets that may be inserted automatically into a headline. Still another region 278 comprises one or more navigation tools.

The upper region 272 comprises a dashboard object 290 that comprises information specific to an article. The dashboard object 290 may comprise some or all of the information that a row object 220 (FIGS. 4-5) comprises and may use the same codes and/or symbols to convey such information. As depicted in FIG. 6, the dashboard object 290 comprises a code 292, which may indicate the source of the article, and the corporation name 294 or a shortened version of it. As depicted in FIG. 6, the content alert flags comprise two flags not depicted in FIGS. 4-5: an "R" indicating a "red alert" associated with the content and/or a "Y" indicating a "yellow alert." Depending on the embodiment of the invention, an alert may appear according to one or more rules and/or criteria, which may set by an administrator, an editor, or both.

The upper region 272 comprises one or more controls and/or display elements that may serve to access information that may relate to the article and/or the corporation; to add, remove, and/or edit information associated with the article and/or the corporation; and/or to access one or more functions comprised by the headlining tool.

A combination drop-down list box control 300 may be used to select a ticker symbol from a list of one or more tickers that may be associated with the article and/or to enter a ticker symbol manually. In response to selection or entry of a ticker symbol, the corporation name 294 may change to reflect the ticker symbol, and, if manually entered, the ticker symbol may be added to the drop-down list associated with the ticker symbol control 300.

The lookup tools menu 302 may comprise one or more menu options that provide access to information regarding corporations and/or people identified in an article. In the displayed embodiment of the invention, selection of a menu item may cause display of a dialog box (not pictured) that can accept input of one or more search criteria and/or one or more user interface elements supporting selection of one or more corporations and/or persons. Depending on the embodiment, selection of one or more corporations may cause one or more corresponding ticker symbols to be added to the ticker entry field 304; and selection of one or more persons may cause one or more corresponding identification codes to be added to the code entry field 306.

Tickers associated with the article appear in the ticker display field 308. In an embodiment of the invention, an editor may manually add, modify, and/or remove one or more ticker symbols in the ticker entry field 304. In response to a command from the editor, the one or more ticker symbols in the ticker entry field 304 can be associated with the article, and such association may be in addition to the article's designated ticker, which is the ticker symbol displayed in the ticker symbol control 300.

Similarly, codes associated with the article appear in the code display field 310. A code may identify, e.g., a unique person or industry, among other things. In an embodiment of the invention, an editor may manually add, modify, and/or remove one or more codes in the code entry field 306. In response to a command from the editor, the one or more codes in the code entry field 306 can be associated with the article.

While being composed, a headline may appear in the headline entry field 320. The headline entry field 320 may be implemented as a control supporting manual editing of a headline. In an embodiment of the invention, the headline entry field 320 may be blank when headlining of an article commences. Embodiments may also provide one or more possible initial headlines, and may provide for variation of the initial headline depending on the command used to initiate headlining and/or one or more configured properties. For example, an editor may be able to specify that the initial headline comprise the name of the corporation (or a shortened version of it) or, alternatively, that it comprise the headline extracted in block 172 (FIG. 3) of preprocessing 160 (FIG. 3).

Headline composition may also make use of one or more snippets 322, which appear in the snippet region 276. A snippet 322 may be, e.g., a pre-constructed word, phrase, or code, provided for convenience during headlining. As depicted in FIG. 6, a snippet comprises a word, phrase or code 324 and a shortcut 326. According to an embodiment of the invention, a shortcut 326 present in the headline entry field 320 may be replaced by its corresponding word, phrase, or code on submission of the headline.

Snippets 322 may, depending on the embodiment and/or the configuration of an embodiment, be created, modified, and/or deleted by one more administrators, one or more editors, or both. Snippets 322 may also be assembled into one or more groups, each comprising one or more snippets 322, and one or more snippet tabs 328 may be used to select which group of snippets 322 appears in the snippet region 276.

In an embodiment of the invention, one or more groups of snippets 322 may be associated with a field or fields other than the headline entry field 320. For example, a group of snippets 322 may comprise one or more codes such as appear in the code entry field 304. Selection of a snippet 322 from the group may than cause the associated code to be inserted into the code entry field 304.

According to an embodiment of the invention, pre-constructed headlines are provided. A drop-down list 340 provides one or more general-purpose headlines. When a pre-constructed headline is selected from the drop-down list, the pre-constructed headline may replace any current contents of the headline entry field 320. A pre-constructed headline may be parameterized, comprising one or more tokens that may be replaced automatically by specified properties associated with the article and/or corporation. For example, a pre-constructed headline may include the token "{Co},"  which is replaced with the company name 294 upon selection of the headline.

Other drop-down lists may comprise pre-constructed headlines. For example, a drop-down list 342 may comprise one or more pre-constructed headlines that may be associated with corporate earnings-per-share ("EPS") estimates. Another drop-down list 344 may comprise one or more headlines that may be associated with corporate revenue estimates. An embodiment of the invention may support other types of pre-constructed headlines in addition to or instead of some or all of those described herein.

A button 346 may be provided to refresh the headline entry field 320. In the embodiment depicted in FIG. 6, refreshing the headline entry field 320 may comprise clearing any text that may be in the headline entry field 320 an inserting the corporate name 294.

A button 348 may be provided to indicate that a corrected headline is being composed. Upon selection of the button 348, the term "CORRECT:" may be inserted at the beginning of the headline entry field 320, and/or a code signifying a correction may be appended to the code entry field 304.

A region 274 of the headlining screen 270 may comprise the text 360 of the article. Line numbers 362 may be presented with the text 360. The user interface that comprises the headlining screen 270 may comprise one or more controls (not pictured) for scrolling the text 360 if it cannot be displayed in its entirety within the headlining screen 270.

One or more terms within the text 360 may have been identified and/or classified in block 180 (FIG. 3) of preprocessing 160 (FIG. 3). Such a term may be indicated visually within the headlining screen 270 by, e.g., altering the color of the term and/or the background behind the term.

The navigation region 278 may comprise one or more tools for finding and/or moving between classified terms in an article. As depicted in FIG. 6, headlining screen 270 comprises tools for moving back and forth between terms related to earnings 370, mergers & acquisitions 372, job cuts 374, the FDA 376, warnings 378, yellow alerts 380, an red alerts 382. An embodiment of the invention may support one or more user-configured classifications and associated navigation tools instead of and/or in addition to those depicted in FIG. 6.

A similar tool 383 may be provided for navigating between tables that may be present in an article. Navigation to a term may comprise, e.g., scrolling the text 360 so that the term is visible in the text region 274 and/or highlighting the term.

As depicted, a navigation tool comprises a left arrow 384, for moving to the previous occurrence of an associated term, and a right arrow 386 for moving to the next occurrence of an associated term. The number 386 of occurrences of terms within a classification also appears within the associated navigation tool. If, for a given classification, no terms have been found within an article, the associated navigation tool will be disabled.

The caption of a navigation tool may be colored to match the coloration of terms in the associated classification.

A user interface may comprise controls for navigating to every occurrence of a specific word or phrase within a given article. The headlining screen 270 comprises a combination drop-down list box 390 for specifying a word or phrase. A word or phrase may be specified manually, or, alternatively, editor input may direct the drop-down list 390 to display one or more words and/or phrases. The one or more words and/or phrases may comprise those specified as part of configuration and/or those newly entered while viewing a given article. A button 392 labeled "Find Next" may be used to navigate cyclically between occurrences, if any, of the word or phrase specified in the combination drop-down list box 390.

A button 400 labeled "Send" is provided for dispatching the headline appearing in the headline entry field 320. An embodiment of the invention may modify the headline according to one or more configured rules before the dispatch occurs. For example, the ticker symbol appearing in the ticker symbol control 300 may be appended to the headline.

Dispatch of the headline may be associated with further processing. For example, the headline count 252 may be incremented, and/or the contents of the ticker display field 308 and/or the code display field 310 may be associated with the headline and/or the article.

The button 402 labeled "First Hd" dispatches the headline as described above, but may further update a progress flag 254 indicating that the first headline associated with an article has been dispatched.

A button 404 labeled "Rtn Mtr" corresponds to the return to monitor toggle, which may automate the return to the monitoring facility following the completion of a headlining task. The return to monitor toggle has two states: engaged and disengaged, and selecting the button 404 changes the state of the return to monitor toggle. If the toggle is engaged, use of the "Send" button 400 or the "First Hd" button 402 will automatically exit the headlining tool and return to he monitoring facility. A button 406 may be used to return manually to the monitoring facility.

One or more buttons 408 may be provided to clear the progress flags 254 as headlining passes through the workflow. A menu 410 may also be provided with one or more menu options to undo the action of one or more of the buttons 408.

A command line 420 may provide access to one or more other functions. For example, entry of a valid article number on the command line 420 may cause that article to appear in the headlining screen 270. Another command may cause display of information related to a corporation as discussed in connection with FIG. 7.

One or more controls may be provided for manipulation of and/or navigation between articles. A button 424 labeled with a skull-and-crossbones ("☠ ") may manually remove an article from the system's view. If more than one article has been selected for headlining from the monitoring screen 200 (FIG. 4), the next article may be presented in headlining screen 270. Otherwise, the monitoring facility is resumed. If more than one article has been selected for headlining, button 426 advances the headlining tool to the next article.

According to an embodiment of the invention, a corporate information screen 450, as depicted in FIG. 7, may be used in connection with, e.g., a monitoring facility and/or a headlining tool. The corporate information screen 450 may comprise, e.g., the corporation name 452, descriptive information 454, historical pricing 456, earnings estimates 458, earnings information 460, dividend information 462, and/or corporate news 464. One or more of these items of information may comprise hyperlinks to one or more respective presentations (not pictured) of further related information.

Descriptive information 454 may comprise, e.g., the market capitalization 470 and/or the number of employees for the corporation name 452.

Historical pricing 456 may comprise the average trading volume over the past three months 476 and/or the last recording closing price 478.

Earnings estimates may comprise mean estimates for earnings per share ("EPS") 484 and/or revenue 486 for one or more time periods 488, and/or the number 489 of estimates that were used to compute the mean or means. The source 490 of the information may also appear. A source 490 may be selected from a drop-down menu 492, and the length of the time period (e.g., quarter or year) may be selected from a drop-down menu 494.

Earnings information 460 may comprise the month 498 in which the corporation's fiscal year ends and/or the currency 500 in which the corporation reports earnings. Dividend information 462 may comprise the frequency 504 and/or amount 506 of the corporation's dividend payments, if any.

The corporate news 464 may comprise one or more news headlines 512 for the selected company ticker. A news headline 512 may comprise, besides the headline text 514, additional information, e.g., the time 516 the article was received, the source of the article 518, and/or the story number 520. Each news headline 512 may comprise a hyperlink to the associated article.

A command line 524 may accept a ticker symbol and/or a corporation name specifying a corporation for which information is to be presented in the corporate information screen 450.

A headlining station 162 (FIG. 2) according to an embodiment of the present invention may comprise two or more electronic display devices. With such a configuration, one or more screens and/or windows described herein may appear on one such electronic display device while one or more other screens and/or windows. For example, the headlining screen 270 (FIG. 6) may appear within a window presented on a first electronic display device while the corporate information screen 450 (FIG. 7) appears within in a window presented on a second electronic display device.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modifications are intended to be included within the scope of the invention. Except to the extent necessary or inherent in the processes themselves, no particular order to steps or stages of methods or processes described in this disclosure, including the Figures, is implied. The order of many, if not all, process steps may be varied without changing the purpose, effect or import of the methods described.

We claim:

1. A computerized system for providing headlines for articles, comprising:
   one or more processors; and
   one or more non-transitory computer-readable storage media, operatively coupled to at least one of the processors and encoded with instructions that comprise:
      a preprocessing module for processing an electronic article for which a text headline is to be provided by generating metadata related to content of the article and by extracting one or more tickers from the electronic article; and
      a headline-editing module that includes:
         a plurality of tools related to at least one of creating the text headline and editing the text headline, and
         a user interface for providing access to one or more of the plurality of tools, the user interface including a display that includes the text headline and the one or more of the plurality of tools;
      wherein at least one of the plurality of tools uses at least some of the metadata generated by the preprocessing module in order to specify that the text headline includes a corporation name that is associated with a ticker selected from the one or more tickers using the user interface.

2. A system as in claim 1, wherein the headline-editing module comprises a headline monitoring facility.

3. A system as in claim 2, wherein the headline-monitoring facility uses at least some of the metadata generated by the preprocessing module and comprises a display that includes information associated with one or more articles to assist an editor in prioritizing the one or more articles for headlining.

4. A system as in claim 1, wherein the headline-editing module comprises a window-based application interface, which exists in a window-based operating environment.

5. A computerized system for providing headlines for articles and storing the articles, comprising:
   one or more processors; and
   one or more non-transitory computer-readable storage media, operatively coupled to at least one of the processors and encoded with instructions that comprise:
      a headlining module for receiving an article, generating metadata, related to text in the article, useful for creating a text headline related to the article, and extracting one or more tickers from the article, the headlining module providing for display of at least part of the text in the article in accordance with at least part of the metadata and including a plurality of tools to assist a human editor in creating the text headline in order to specify that the text headline includes a corporation name that is associated with a ticker selected from the one or more tickers;
      a disposition module adapted to dispatch the text headline to one or more consumers; and
      a storage module that processes the article for storage and retrieval without impeding creation and/or distribution of the text headline.

6. A computerized system as in claim 5, wherein the headline-editing module comprises a headline monitoring facility.

7. A computerized system as in claim 6, wherein the headline monitoring facility is adapted to use at least some of the generated metadata and comprises a display that includes information associated with one or more articles to assist an editor in prioritizing the one or more articles for headlining.

8. A computerized system for providing headlines for articles relating to one or more of a plurality of subject matter categories, comprising:
   one or more processors; and
   one or more non-transitory computer-readable storage media, operatively coupled to at least one of the processors and encoded with instructions that comprise:
      at least one categorization module for determining at least one subject matter category for each of one or more electronic articles received by the system; and
      a plurality of headlining modules;
      wherein the at least one categorization module is adapted to provide, to one or more of the plurality of headlining modules as determined by the categorization module, an article received by the system and metadata useful for creating and/or editing a text headline related to the article, wherein the one or more of the plurality of headlining modules are selected by the at least one categorization module; and
      wherein each headlining module that receives the article generates metadata, related to text in the article, useful for creating the text headline related to the article, and extracts one or more tickers from the article, the headlining module providing for display of at least part of the text in the article in accordance with at least part of the metadata and including a plurality of tools to assist a human editor in creating the text headline in order to specify that the text headline includes a corporation name that is associated with a ticker selected from the one or more tickers.

9. A method of providing headlines for articles, comprising:
- preprocessing an electronic article for which a text headline is to be provided by generating metadata related to content of the article and by extracting one or more tickers from the article;
- providing a plurality of tools related to at least one of creating the text headline and editing the text headline, and a user interface for providing access to one or more of the plurality of tools, the user interface including a display that includes the text headline and one or more of the plurality of tools; and
- using the one or more of the plurality of tools to supply the text headline;
- wherein at least one of the plurality of tools uses at least some of the metadata generated by the preprocessing in order to specify that the text headline includes a corporation name that is associated with a ticker selected from the one or more tickers using the user interface.

10. The method of claim 9, wherein the preprocessing of the electronic article comprises a recordation of one or more metadata selected from a group consisting of an article number, a time stamp, a news wire service provider, the text headline, the ticker, a corporation's market capitalization, and a subject matter classification.

11. The method of claim 9, comprising providing a headline monitoring facility for use in selecting one or more electronic articles for which text headlines are to be provided.

12. The method of claim 11, wherein the headline monitoring facility uses at least some of the metadata generated by the preprocessing and comprises a display that includes information associated with one or more articles to assist an editor in prioritizing the one or more articles for headlining.

13. The method of claim 9, wherein the user interface comprises a window-based application interface, which exists in a window-based operating environment.

14. A method of providing headlines for articles and storing the articles, comprising:
- providing a text headline related to an article through use of a headlining module that receives the article, generates metadata, related to text in the article, useful for creating the text headline, and extracts one or more tickers from the article, the headlining module providing for display of at least part of the text in the article in accordance with at least part of the metadata and including a plurality of tools to assist a editor in creating the text headline in order to specify that the text headline includes a corporation name that is associated with a ticker selected from the one or more tickers;
- dispatching the text headline to one or more consumers; and
- processing the article for storage and retrieval without impeding creation and/or distribution of the text headline.

15. The method of claim 14, comprising providing a headline monitoring facility for use in selecting one or more electronic articles for which text headlines are to be provided.

16. The method of claim 15, wherein the headline monitoring facility uses at least some of the generated metadata and comprises a display that includes information associated with one or more articles to assist an editor in prioritizing the one or more articles for headlining.

17. The method of claim 14, wherein dispatching the text headline to one or more consumers comprises distributing the text headline directly or indirectly to a plurality of customers associated with a news organization.

18. A computerized method of providing headlines for articles relating to one or more of a plurality of subject matter categories, comprising:
- determining at least one subject matter category for each of one or more electronic articles;
- providing a plurality of headlining modules;
- wherein determining at least one subject matter category for each of one or more electronic articles is performed by at least one categorization module that is adapted to provide, to one or more of the plurality of headlining modules as determined by the categorization module, an article received by the system and metadata useful for creating and/or editing a text headline related to the article;
- wherein the one or more of the plurality of headlining modules are selected by the at least one categorization module; and
- wherein each headlining module that receives the article generates metadata related to text in the article, useful for creating the text headline, and extracts one or more tickers from the article, the headlining module providing for display of at least part of the text in the article in accordance with at least part of the metadata and including a plurality of tools to assist a human editor in creating the text headline in order to specify that the text headline includes a corporation name that is associated with a ticker selected from the one or more tickers.

19. A non-transitory computer-readable storage medium with programming thereon for causing at least one computer system to perform functions comprising:
- preprocessing an electronic article for which a text headline is to be provided by generating metadata related to content of the article and by extracting, one or more tickers from the article;
- providing a plurality of tools related to at least one of creating a text headline and editing a text headline, and a user interface for providing access to one or more of the plurality of tools, the user interface including a display that includes the text headline and the one or more of the plurality of tools; and
- in response to input from an editor, using the one or more of the plurality of tools to supply the text headline;
- wherein at least one of the plurality of tools uses at least some of the metadata generated by the preprocessing in order to specify that the text headline includes a corporation name that is associated with a ticker selected from the one or more tickers using the user interface.

20. A non-transitory computer-readable storage medium with programming thereon for causing at least one computer system to perform functions comprising:
- providing a text headline related to an article through use of a headlining module that receives the article, generates metadata, related to text in the article, useful for creating the text headline, and extracts one or more tickers from the article, the headlining module providing for display of at least part of the text in the article in accordance with at least part of the metadata and including a plurality of tools to assist a human editor in creating the text headline in order to specify that the text headline includes a corporation name that is associated with a ticker selected from the one or more tickers;
- dispatching the text headline to one or more consumers; and processing the article for storage and retrieval without impeding creation and/or distribution of the text headline.

21. A non-transitory computer-readable storage medium with programming thereon for causing at least one computer system to perform functions comprising:
   determining at least one subject matter category for each of one or more electronic articles;
   providing a plurality of headlining modules;
   wherein determining at least one subject matter category for each of one or more electronic articles is performed by at least one categorization module that is adapted to provide, to one or more of the plurality of headlining modules as determined by the categorization module, an article received by the system and metadata useful for creating and/or editing a text headline related to the article, wherein the one or more of the plurality of headlining modules are selected by the at least one categorization module; and
   wherein each headlining module that receives an article generates metadata, related to text in the article, useful for creating the text headline, and extracts one or more tickers from the article, the headlining module providing for display of at least part of the text in the article in accordance with at least part of the generated metadata and including a plurality of tools to assist a human editor in creating the text headline in order to specify that the text headline includes a corporation name that is associated with a ticker selected from the one or more tickers.

* * * * *

UNITED STATES PATENT AND TRADEMARK OFFICE
CERTIFICATE OF CORRECTION

PATENT NO.        : 9,495,467 B2
APPLICATION NO.   : 11/250829
DATED             : November 15, 2016
INVENTOR(S)       : Ursitti et al.

Page 1 of 1

It is certified that error appears in the above-identified patent and that said Letters Patent is hereby corrected as shown below:

In the Claims

Claim 14, Column 13, Line 47, delete "tools to assist a editor" and insert --tools to assist a human editor--

Claim 19, Column 14, Line 36, delete "by extracting, one or more" and insert --by extracting one or more--

Signed and Sealed this
Seventh Day of March, 2017

Michelle K. Lee
*Director of the United States Patent and Trademark Office*